(12) United States Patent
Garthwaite (10) Patent No.: US 7,533,228 B1
(45) Date of Patent: May 12, 2009

(54) TWO-PASS SLIDING COMPACTION

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 459 days.

(21) Appl. No.: 11/139,292

(22) Filed: May 27, 2005

(51) Int. Cl.
    *G06F 12/12* (2006.01)
(52) U.S. Cl. ...................................... 711/159
(58) Field of Classification Search ................. 711/159
    See application file for complete search history.

(56) References Cited

U.S. PATENT DOCUMENTS

| | | | |
|---|---|---|---|
| 6,996,590 B2 | 2/2006 | Borman | |
| 7,010,555 B2 * | 3/2006 | Blandy et al. | 707/206 |
| 7,016,923 B2 | 3/2006 | Garthwaite | |
| 7,031,990 B2 | 4/2006 | Garthwaite | |
| 7,051,056 B2 | 5/2006 | Rodriguez-Rivera | |
| 7,065,617 B2 | 6/2006 | Wang | |
| 7,069,280 B2 | 6/2006 | Garthwaite | |
| 7,181,585 B2 * | 2/2007 | Abrashkevich et al. | 711/170 |

OTHER PUBLICATIONS

"Garbage Collection"; Sep. 27, 2004; 7 pages; printed off website www.memorymanagement.org.
Edwards; "Artificial Intelligence Project-RLE and MIT Computation Center"; Memo 19-LISP II Garbage Collector; 2 pages.
Abuaiadh, et al; "An Efficient Parallel Heap Compaction Algorithm"; OOPSLA '04; Oct. 24-28, 2004; pp. 224-236; Vancouver, British Columbia, Canada.
Agesen, et al; "An Efficient Meta-Lock for Implementing Ubiquitous Synchronization"; Sun Microsystems; Apr. 1999; pp. 1-27; SMLI TR- 99-76; Palo Alto, CA; USA.
Agesen, et al; "Mixed-mode Bytecode Execution"; Sun Microsystems; Jun. 2000; pp. 1-20; SMLI TR-2000-87; Palo Alto, CA; USA.
Agesen; "GC Points in a Threaded Environment"; Sun Microsystems; Dec. 1998; pp. 1-20; SMLI TR-98-70; Palo Alto, CA; USA.
Ben-Yitzhak, et al; "An Algorithm for Parallel Incremental Compaction"; IBM Haifa Research Laboratory, Mount Carmel; Jun. 20-21, 2002; pp. 100-105; Berlin, Germany.
Appel; "Simple Generational Garbage Collection and Fast Allocation"; Department of Computer Science-Princeton Universtiy; Mar. 1998; 16 pages; Princeton, N.J., USA.

(Continued)

*Primary Examiner*—Hyung S Sough
*Assistant Examiner*—Hamdy S Ahmed
(74) *Attorney, Agent, or Firm*—Robert C. Kowert; Meyertons, Hood, Kivlin, Kowert & Goetzel, P.C.

(57) ABSTRACT

During two-pass sliding compaction, a heap may first be logically divided into fixed-sized segments, or chunks, and information regarding each chunk, known as per-chunk metadata, may be saved for use during the second, sliding phase. In addition to the per-chunk information, information regarding the location and size, called object extent information, may also be saved during the marking phase of two-pass sliding compaction. In the sliding phase of two-pass sliding compaction, live objects are moved to their respective destinations in the heap after first updating any object references in the objects. The order of objects being moved may be maintained across heap compaction. By relying upon the per-chunk and object extent information saved during the marking phase, objects may be processed individually and independent of each other during the sliding phase, according to some embodiments.

23 Claims, 8 Drawing Sheets

OTHER PUBLICATIONS

Detlefs, et al; "Inlining of Virtual Methods"; Sun Microsystems Laboratories; 21 pages; Burlington, MA, USA.

Flood, et al; "Parallel Garbage Collection for Shared Memory Multiprocessors"; Sun Microsystems; Apr. 2001; USA.

* cited by examiner

TWO-PASS SLIDING COMPACTION

BACKGROUND OF THE INVENTION

1. Field of the Invention

This invention related to the field of memory management and more particularly to heap compaction.

2. Description of the Related Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, i.e., when memory space to be allocated to a given object is determined at run time.

Particularly for long-lived applications, though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

One way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

Various parts and levels of a computing system can implement garbage collection. One approach is simply to provide garbage collection as part of a batch compiler's output. In this approach to garbage collection, in addition to generating code for the functionality supported by an application, the batch compiler may generate code that automatically reclaims unreachable memory space without explicit direction from a the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

Another approach to garbage collection may be taken in some systems that employ "virtual machines". In such a system, a compiler or an interpreter may convert source code for an application from a high-level language to instructions called "byte code" for virtual machines that various processors can be configured to emulate. One example of a high-level language for which compilers and interpreters are available to produce such virtual-machine instructions is the Java™ programming language. (Java is a trademark or registered trademark of Sun Microsystems, Inc., in the United States and other countries.) Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

In distinguishing reachable objects from unreachable objects, garbage collectors often have to trace references between objects—for example, some garbage collectors have to identify those reference fields of an object that have been modified, as well as the objects that are referred to in the modified fields. In order to limit the amount of analysis required for collection, a record or trace of objects whose references have been modified may be maintained.

Garbage collection schemes, such as mark-sweep and reference-counting garbage collection techniques, are generally susceptible to fragmentation, where the heap includes more and more gaps between active, live objects. As a heap becomes more fragmented, it may become more and more difficult to allocate large spans of memory. To avoid this fragmentation problem, many garbage collectors compact the heap periodically to remove some or all of the gaps between live memory objects. Compacting a heap may coalesce the gaps into a single, contiguous block of memory, thereby allowing for larger objects to be allocated.

There are a number of traditional approaches to heap compaction. For example, one is to compact all reachable object to one end of the address range of the heap. Because groups of objects are moved in address order, this technique is often referred to as sliding compaction. This approach works well even when objects differ in size. By preserving the ordering of objects in the heap, it allows for a simple, pointer-bumping allocation scheme. The primary obstacle to the use of sliding compaction on multiprocessors is that the act of sliding object must be carefully staged so that reachable objects are not overwritten before they can be moved to their final destinations.

SUMMARY

Two-pass sliding compaction, as described herein, may involve two distinct phases that operate on the objects in the heap and their references. During two-pass sliding compaction, the heap may first be logically divided into fixed-sized segments, or chunks, and information regarding each chunk, known as per-chunk metadata, may be saved during the first, or marking, phase of two-pass sliding compaction for use during the second, or sliding phase. In addition to the per-chunk information, information regarding the pre-compaction starting address and extent, called object extent information, may also be saved, such as in an object extent bitmap, during the marking phase of two-pass sliding compaction. For instance, a heap compactor may traverse the heap, marking all reachable objects, and, for each reachable object, update per-chunk metadata for the chunk or chunks containing the respective object with information regarding the respective object.

In the sliding phase of two-pass sliding compaction, live objects are moved to their respective destinations in the heap and any object references are updated. A heap compactor utilizing two-pass sliding compaction may, in some embodiments, perform only two passes over objects in the heap and their references. As with other sliding compaction techniques, two-pass sliding compaction maintains the order of objects being moved. By relying upon the per-chunk and object extent information saved during the marking phase, object references may be updated individually and independently of when the referenced objects are relocated during the sliding phase, according to some embodiments. Thus, two-pass sliding compaction may decouple the updating of object references from the relocating of objects through the use of object extent information and per-chunk metadata.

A compaction process or thread may determine for each chunk in the heap, the amount of live, or reachable memory in the chunk, and the address (and size) of the first memory object in the chunk and may also perform a prefix sum on the total amount of live data below each chunk (according to heap address). Such heap chunk analysis may be performed between the marking and sliding phases of two-pass sliding compaction. Alternatively, it may be performed at the end of the marking phase or the start of the sliding phase, according to various embodiments.

As noted above, the pre-chuck and object information recorded during the first, or marking, phase of two-pass sliding compaction may be used during the second, or sliding, phase to enable the updating of object references in an object independently of when the referenced object is compacted or relocated. When compacting memory objects in a heap (or a portion of a heap, such as a generation), for every memory object moved, references to that object must be updated to point to the object's new location in the compacted heap. The per-chunk and object extent information recorded during the marking phase may be used during the sliding phase to determine an object's final location in the heap after compaction and thus to update references to that object during compaction. Thus, references in a memory object to other objects in the heap may be updated to point to an object's post-compaction location regardless of whether or not the referenced object has been relocated.

Since two-pass sliding compaction preserves the address order of all memory objects in the heap before and after compaction, the final destination of any memory object may be determined during compaction. In other words, since the size and location of every object has been recorded, the starting location of a memory object after compaction may be determined based upon the total size of allocated memory objects lower than it (according to heap address) that are being compacted. In general, two-pass sliding compaction is described herein regarding compacting into lower address ranges of the heap. However, two-pass sliding compaction applied equally well when compacting into higher memory address ranges. Additionally, two-pass sliding compaction may be utilized when compacting memory either to lower or higher address ranges and the memory range being compacted may in general be any contiguous range of memory, such a subset of a heap, a single generation of the heap, or even a subset of a generation, according to various embodiments.

Each phase of two-pass sliding compaction may be performed in parallel by multiple threads. However, in general, the marking phase must be completed before the second phase can be started, but the second phase may then also be performed in parallel by multiple threads, in some embodiments. When multiple threads are compacting a heap in parallel, during the marking phase each thread may claim an object in the heap and update the per-chunk metadata for the chunk or chunks (since an individual object may span multiple chunks) containing that object, according to certain embodiments. For example, a thread may add the size of the object being marked to a per-chunk total of live data and may also record the object's extent information, such as in an object-extent bitmap. Additionally, the thread may determine if the object represents the first object in any particular heap chunk and record the object's starting point in the per-chunk metadata for that chunk. The marking of objects may, in some embodiments, be performed by tracing the objects starting from root references, such as references in a processor cache, memory stack, call stack, and/or processor registers.

During the second, or sliding, phase of two-pass sliding compaction, each thread may claim a chunk of the heap, using any of numerous well-known thread synchronization methods, and update all the references to memory objects in the chunk and then slide (relocate) all the memory objects in the chuck to their final, post-compaction, destination addresses as determined by the previously recorded object extent information and per-chunk metadata. When compacting a heap in parallel, the compacting threads may either compete to claim chunks to empty or to claim chunks to fill, according to various embodiments.

Multiple threads, each compacting chunks of the heap, may coordinate regarding which chunks have and have not been emptied and which have been filled to ensure that a chunk is empty (i.e. the memory objects in the chunk are compacted, and thus moved to their final destination) before any memory objects from another chunk are compacted (i.e. slid) into it. For example, each compacting thread may claim the next higher addressed chunk (whether claiming chunks to empty or fill) to compact and when finished with that chunk it may then claim the next unclaimed chunk in address order, according to some embodiments. According to other embodiments, a per-chunk counter may be maintained indicating the number of destination chunks to which memory in a chunk may be relocated by compaction. This per-chunk counter may be decremented as memory destined for each of the possible destinations is relocated. Once the counter indicates all memory in a chunk has been relocated, a compacting thread may claim the chunk so that it may be filled. In these embodiments, chucks need not be emptied or filled in address order.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1A:
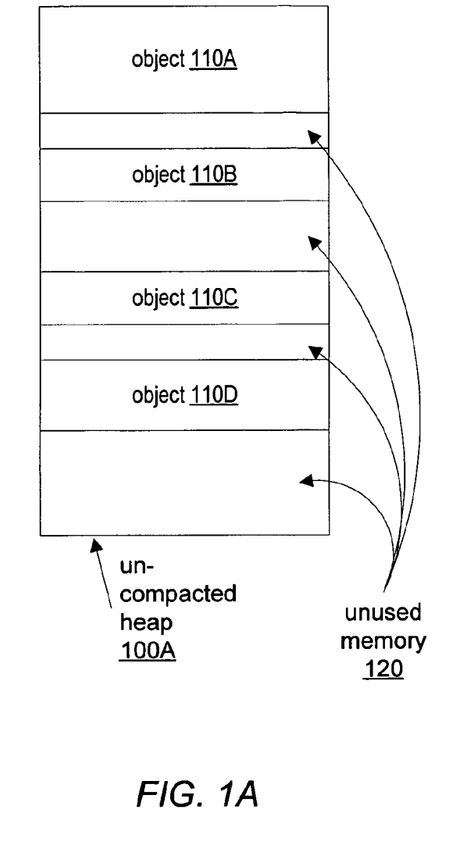
FIGS. 1A and 1B are block diagrams illustrating an exemplary heap before and after two-pass sliding compaction, according to one embodiment.
Figure 1B:
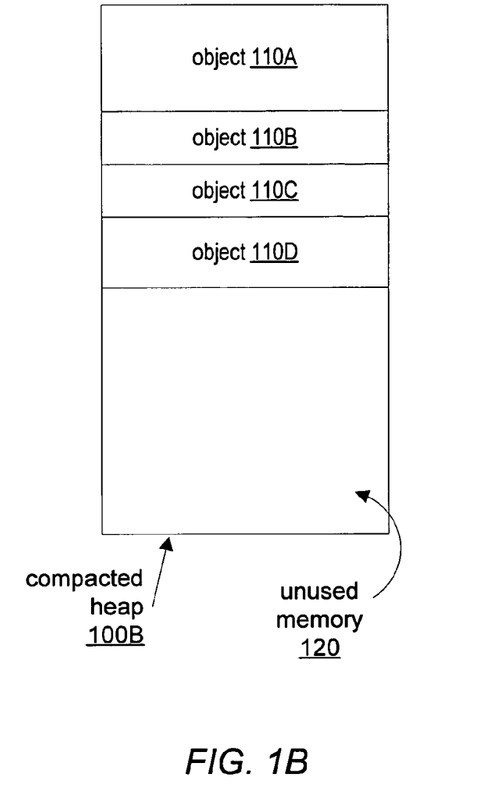

Two-pass sliding compaction, as described herein, may involve compacting a memory heap of a computer system. FIGS. 1A and 1B illustrate such a heap before (FIG. 1A) and after (FIG. 1B) two-pass sliding compaction as described herein. For example, a heap compactor process may compact un-compacted heap 100A including memory objects 110A, 110B, 110C, and 110D, as illustrated in FIG. 1A. Un-compacted heap 110A may also include one or more sections of unused memory 120. As noted above, a heap may become fragmented because of de-allocating or freeing memory objects no longer needed by applications or other processes of the system. Two-pass sliding compaction may analyze un-compacted heap 100A to determine the starting and ending addresses of each of objects 110A-D and may record this object extent information in any of various manners, including, in one embodiment, an object extent bitmap, as will be discussed in more detail below.

The heap compactor process implementing two-pass sliding compaction may also logically partition or divide un-compacted heap 100A into multiple segments or chunks of fixed, equal size and may trace through the heap, such as by following references to the memory objects to determine which memory objects are live and/or reachable. Additionally, the heap compactor may determine and record per-segment or per-chunk metadata that may include such information as the total amount of live memory data in the chuck and the address, either absolute or relative to the start of the chunk, of the first live memory object in the chunk. For example, the heap compactor (or multiple compactor threads in parallel) may trace through the reachable objects in the heap adding each object's size to the per-chunk metadata for the chunk or chunks containing the object. In some embodiments, the heap compactor may analyze the pre-chunk metadata recorded during the marking of the reachable objects to determine the total amount of live memory data in un-compacted heap 100A below (in address order) each chunk and may record the total amount of live data below a chunk in per-chunk metadata for that chunk. In other words, the total size of all live objects in all chunks below (i.e. with lower heap addresses) a particular chunk may be stored as part of the metadata for the particular chunk. For example, a heap compactor may perform a prefix summation of the amount of live data in each chunk to determine the total amount of live data below each chunk. As noted above a heap compactor may analyze the per-chunk metadata between the marking and sliding phases of two-pass sliding compaction. The per-chunk metadata may be stored in any suitable manner such that the information is accessible to the heap compactor on a per-chunk basis. In other words, the heap compactor may store the per-chunk metadata in a format allowing the metadata for a particular heap segment or chunk may be accessed and utilized individually.

As noted above, two-pass sliding compaction may preserve the address order of all memory objects in a heap across compaction. In other words, as illustrated in FIGS. 1A and 1B, objects 110A-110D are in the same order both before and after compaction. During compaction, the heap compactor may be configured to determine the post-compaction destination address of any individual memory object based upon the recorded object extent information and/or the per-chunk metadata. For example, since the ordering objects 110A-110D may be preserved across compaction, the final address for any particular object, such as object 110D, may be determined by calculating the total size of all objects below (i.e. with lower heap addresses) that object 110D. As is apparent from FIG. 1B, the address of object 110D in compacted heap 100B corresponds to the next heap address below the total size of objects 110A-C. Thus, in one embodiment, a heap compactor may be configured to access the recorded object extent information and total the sizes of all objects below (in heap address order) an object to determine the post-compaction destination address of the object.

When compacting a heap according to two-pass sliding compaction as described herein, a heap compactor may be configured to determine the destination address for an object when actually compacting the object. Thus, when implementing two-pass sliding compaction, a heap compactor may not go through the heap determining the destination address for all objects before beginning to slide or compact the objects. For example, a heap compactor may be configured to determine the destination address for object 110B and to move or slide object 110B to its destination address prior to determining the destination addresses of objects 110C or 110D. However, as will be discussed in more detail below, objects may include references to other objects and thus, a heap compactor implementing two-pass sliding compaction may be configured to update any references in an object being compacted. When updating a reference to another object, the heap compactor may determine the destination address of the referenced object and update the reference to that object when sliding or compacting the object containing the reference. For example, if object 110B includes a reference to object 110D, a heap compactor, when sliding object 110B, may determine the destination address of object 110D (such as according to the recorded object extent information, described above) and update the reference to object 110D to point to object 110D's destination address, even though object 110D may not have been compacted yet. Likewise, if object 110B includes a reference to object 110A, a heap compactor, when sliding object 110B, may determine the destination address of object 110A and update the reference to object 110A to point to object 110A's destination address, even though object 110A may have already been compacted. Thus, any references in each of objects 110A-D may be updated on an object-by-object basis as those objects are compacted. Thus, during the middle of compaction, objects 110A and 110B may have been compacted and correspondingly any references in those objects may have been updated, but objects 110C and 110D may not have been compacted and thus any references in objects 110C and 110D may not have been updated and thus may point to the earlier un-compacted address of referenced objects.

Please note that a memory object, or objects, such as objects 110A-D, as used herein may be any block of allocated memory in a heap. In various embodiments, an object may be a JAVA programming object, a C++ programming object, or other allocated block of memory. Additionally, as noted above, the terms, "object" and "memory object" as used herein, both refer to a memory object that is accessible and allocated in a heap, and are used interchangeably herein. Also, the terms "reachable" and "live" may be used interchangeably herein. Note that for clarity and ease of description, only a small number of chunks, objects and references are included in the examples and embodiments described herein. However, in other embodiments, a heap may include many more chunks, objects and references.

Figure 2:
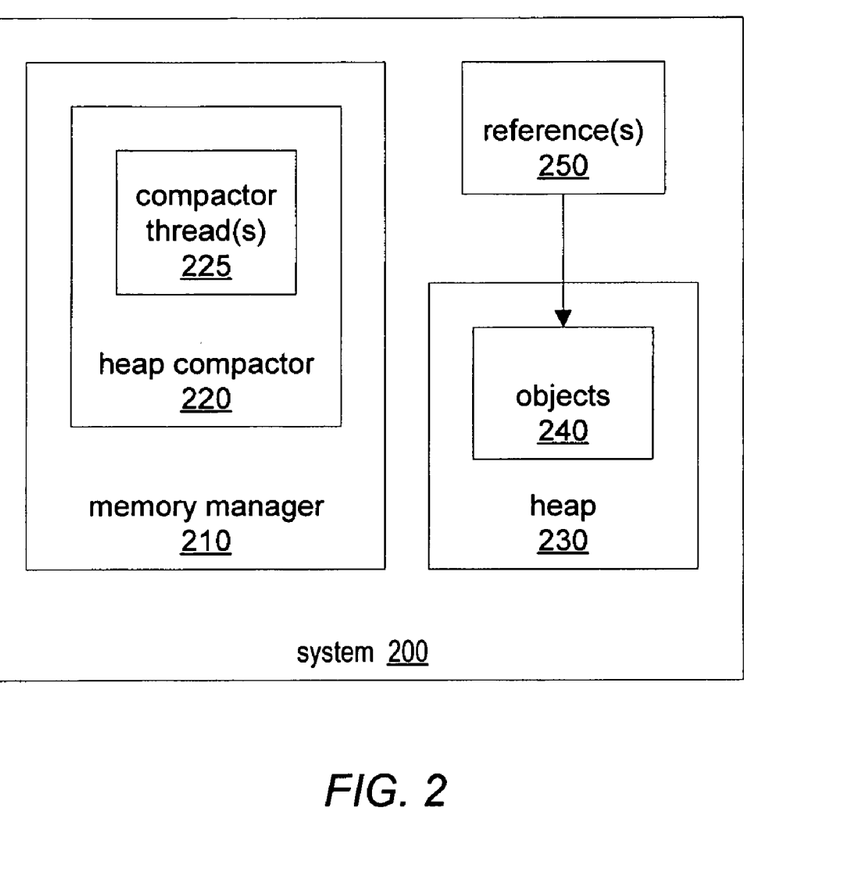
FIG. 2 is a block diagram illustrating one embodiment of a system implementing two-pass sliding compaction, as described herein.

FIG. 2 is a block diagram of a computer system capable of implementing two-pass sliding compaction as described herein. As illustrated in FIG. 2, system 200 may include a memory manager 210 configured to manage the allocation and de-allocation of memory from heap 230. As part of managing heap 230, memory manager 210 may utilize a heap compactor 220 configured to implement two-pass sliding compaction, as described herein. As noted above, heap 230 may include one or more memory objects 240. Additionally, system 200 may include one or more references 250 to objects 240 in heap 230, according to some embodiments. While each of objects 240 may include one or more references to others of objects 240 in heap 230, references 250 may also reside outside of heap 230, such as in a processor cache, memory stack, call stack, and/or processor registers, according to some embodiments. Additionally, heap compactor 220 may include one or more compactor threads 225 for performing two-pass sliding compaction in parallel, as will be discussed in more detail below. In some embodiments, system 200 may comprise one or more JAVA virtual machines and or JAVA runtime environments. In other embodiments, however, system 200 may include processes implemented in C/C++ or other languages. In general, two-pass sliding compaction may be implemented in any of various computer programming languages, such as JAVA, C, C++, etc.

Figure 3:
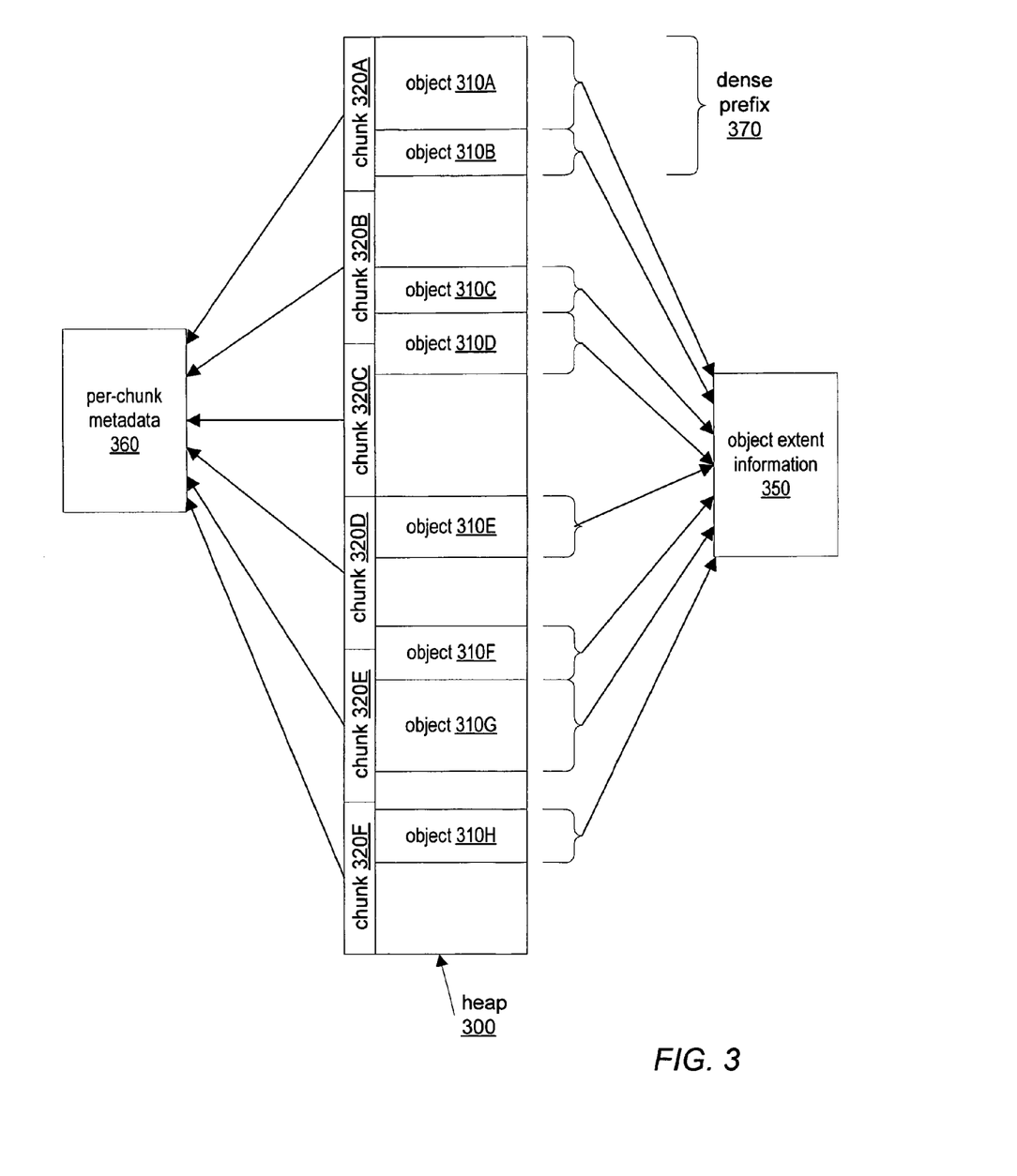
FIG. 3 is a block diagram illustrating various components for implementing two-pass sliding compaction, in one embodiment.

As noted above, information regarding each logical chunk and each object in the heap may be saved during the marking phase of two-pass sliding compaction. FIG. 3 is a block diagram illustrating the logical association of the recorded object extent information and per-chunk or per-segment metadata to a heap. As noted above, as part of performing two-pass sliding compaction, a heap compactor may determine and record the object extent information for each live object in heap 300. In one embodiment, the starting and ending addresses of each of objects 310A-310H may be determined and recorded in object extent information 350. Alternatively, the pre-compaction starting address and total size of each live object in heap 300 may be recorded in object extent information 350. In one embodiment, object extent information 350 may include an object extent bitmap for maintaining the starting address, ending address and size of each object in heap 300. Object extent bitmaps will be discussed in more detail below.

As described above, during the first, or marking, pass of two-pass sliding compaction, a heap compactor, such as heap compactor 220, may analyze the contents of heap 300 to determine the starting and ending addresses of each of objects 310A-310H. For example, heap compactor 220 may use references 250 to trace through all the live objects in heap 300, according to one embodiment. Since, in general, there must be a reference to each live object in heap 300, either from another object, or from a reference external to heap 300, as described above, a heap compactor may be configured to begin with a reference to one object and then following all references in that object to locate and analyze other objects. In another embodiment, object extent information 350 may include an object extent bitmap for identifying each minimum unit of memory, such as a 4-byte word or pairs of 4-byte words, containing data associated with a reachable object in heap 300. As numerous methods and algorithms for locating live memory objects by tracing references to the objects are well known the art, they will not be discussed in detail herein.

Also during the marking phase of two-pass sliding compaction, a heap compactor may logically partition or divide the heap into multiple chunks or segments of fixed size, such as chunks 320A-320F, illustrated in FIG. 3. A heap compactor may also analyze each of the multiple chunks of a heap to determine and record per-chunk metadata 360. For example, heap compactor 220 may analyze each chunk in turn and determine the total about of live data (i.e. the total size of all live objects) in the chunk as well as information about the first reachable or unreachable object spanning onto a chunk such as its starting address, class information, and size. Heap compactor 220 may store or maintain such per-chunk metadata in heap chunk metadata 360, illustrated in FIG. 3.

In some embodiments, the memory used to store per-chunk metadata 360 and object extent information 350 may be a part of heap 300. For example, per-chunk metadata 360 may be stored in a special section of heap 300, in one embodiment. In another embodiment, the per-chunk metadata for each individual chunk may be stored in a header section of the chunk set aside for such purposes. In other embodiments, however, per-chunk metadata 360 and object extent information 350 may be stored in memory separate from heap 300, such as in memory specifically dedicated for memory management overhead. In some embodiments, per-chunk metadata 360 and object extent information 350 may be determined completely during the first, or marking, phase of two-pass sliding compaction, while in other embodiments, per-chunk metadata 360 and object extent information 360 may be at least partially updated and maintained may memory manager 210 outside of performing two-pass sliding compaction, such as in response to allocating and de-allocating individual memory objects.

In some embodiments, a heap compactor may sequentially analyze every object in heap 300 and determine and record per-chunk metadata and object extent information for each object on an object-by-object basis. In other embodiments, however, a heap compactor may include multiple threads, each configured to analyze objects in the heap to determine and record the objects' extent information as well as to update per-chunk metadata 360 for individual chunks of heap 300 containing each object. Thus, the first, or marking, phase of two-pass sliding compaction may be performed in parallel by multiple heap compactor threads 225 of heap compactor 220. For example, a first compactor thread 225 may analyze object 310A while another compactor thread 225 may analyze object 310B, according to one embodiment. When the first compactor thread 225 has completed analyzing and recording information regarding object 310A, it may then analyze another unanalyzed object, such as object 310C, according to one embodiment. In some embodiments, the objects of the heap are traced through object references, such as by starting with root references in a processor cache, memory stack, call stack, and/or processor registers.

Furthermore, a heap may include one or more sets of contiguous memory objects, such as objects 310A and 310B in heap 300. When such a set of contiguous, live memory objects resides at that start of a heap (at the lower end of the heap's address range, say) the objects in that continuous set may already be compact and thus, may not need to be analyzed or compacted during two-pass sliding compaction. Additionally, since those objects may not be moved during compaction, any references to those objects may not need to be updated during two-pass sliding compaction. Such a block of contiguous, already compact, objects at the start of a heap may be considered a dense prefix, such as dense prefix 370, and may be excluded from two-pass sliding compaction, according to certain embodiments. This dense prefix may even be chosen to have a suitably bounded amount of unreachable objects interspersed in the dense prefix to allow for the dense prefix to be larger, in some embodiments. Such objects may, in one embodiment, be overwritten with non-reference-bearing objects, such as arrays of integers for example, and for purposes of compaction may be treated as if they were reachable. If such a dense prefix spans more than one chunk of the heap, as partitioned by heap compactor 220, those chunks fully within the dense prefix may also be excluded from further analysis and/or processing as part of two-pass sliding compaction. However, any references contained in objects of such a dense prefix, such as any references in objects 310A and 310B, may need to be updated if the objects pointed to by those referenced are to be moved during compaction. Thus, while those objects and chunks within a dense prefix may not be fully analyzed during the marking phase of two-pass sliding compaction, the objects in the dense prefix may be accessed to update any references to objects outside the dense prefix.

Figure 4A:
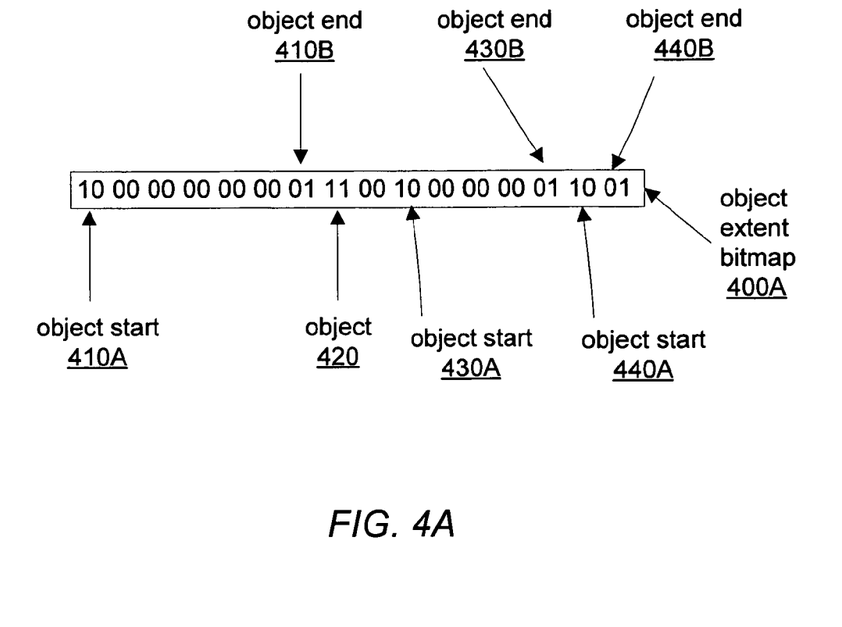
FIGS. 4A and 4B are block diagrams illustrating two embodiments of an object extent bitmap.

Object extent information 350 may be maintained in any of various data structures, according to different embodiments. In one embodiment, a bitmap may be used in which individual sets of one or more bits represent an address or an address range of a heap. FIG. 4A illustrates a small example of such a bitmap. In object extent bitmap 400A, which may be, or may be part of, object extent information 360, each set of two bits represents a single address in heap 300, according to one embodiment. Please note however, that object extent bitmap 400A is merely exemplary and represents a small portion of the address range of heap 300. In other embodiments, much larger bitmaps may be used corresponding to larger address ranges. Object extent bitmap 400A, as illustrated in FIG. 4A, uses a two-bit value of 0x10 to represent the start of an object, a two-bit value of 0x01 to represent the end of an object, and uses a two-bit value of 0x11 to represent a single object starting and ending in the same unit of memory, according to one embodiment. Thus, FIG. 4A illustrates four objects. For instance, a first object starts at the beginning of the address space as illustrated by object start 410A and ends at location object end 410B. The next object, object 420 is an object that only takes up a single unit of memory. For example, if each two-bit value in object extent bitmap 400A represents a single two-word address, object 420 would be two-words in length. Object start 430A and object end 430B represent a third object and object start 440A and object end 440B represents the fourth object illustrated in object extent bitmap 400A. As illustrated in FIG. 4A, a gap of unused memory exists between the end of the first object, represented by object end 410B and the start of the second object, represented by object 420. However, no such gap exists between the end of the third object, represented by object end 430B and the start of the fourth object, represented by object start 440A.

According to the embodiment illustrated by FIG. 4A, each set of two bits in object extent bitmap 400A may represent one or more address values from heap 300. For instance, in one embodiment, each two-bit value in object extent bitmap 400A may represent one memory word in heap 300, while, in other embodiments, each two-bit value may represent two, four or more memory words of heap 300. Thus, bits corresponding to the pre-compaction starting address of an object may be set to a particular bit pattern representing the start of an object and the ending address may also be marked in the bitmap by setting those bits corresponding to the ending address of the object. The particular encoding or bit patterns used to represent the starting and ending of objects in object extent information 350 may vary from embodiment to embodiment. For example, in one embodiment, as described above, a bit-pattern of 0x10 may represent the pre-compaction starting address of an object and a bit-pattern of 0x01 may represent the ending address of an object. In another embodiment, a bit pattern of 0x01 may represent the pre-compaction starting address and 0x10 may represent the ending address of objects. Other bit patterns may be used in other embodiments.

Using two-bit combinations in an object extent bitmap, such as those described above regarding FIG. 4A, may allow a heap compactor to iterate over the bitmap more quickly. In particular a heap compactor may, in some embodiments, be configured to take advantage of the fact that certain bit patterns may not be possible in such an object extent bitmap. For example, the pattern 0x1010 may imply the adjacent starting of two objects with no end for the first object and the pattern 0x0101 may imply the adjacent ending of two objects without a start for the second object, or vice versa, depending upon the exact encoding scheme employed. Furthermore, the amount of reachable, or live, memory in the range specified by each non-zero sequence of bitmap patterns may be specific to, apparent from, each individual bitmap pattern.

Consider Table 1, below, which illustrates for each possible 4-bit pattern, whether the pattern is possible, whether the memory word immediately preceding the memory of described by pattern is live, whether the memory word immediately after the memory described by the pattern is live, and how many words are live in the memory described by the pattern. Additionally, the notes column of Table 1 describes the nature of the two, two-word addresses described by each pattern. The input parity column represents whether the memory word immediately preceding the memory of the pattern in question is part of a live object. For instance, pattern 0001 represents the end of an object, and thus the memory immediately preceding the pattern must be part of a live object. Therefore, the input parity column for pattern 0001 shows a 1. Similarly, the output parity column represents whether the memory word immediately after the memory of the pattern in question must be live. Please note that an output parity of 0 does not necessarily mean that that the memory word immediately after the pattern must be dead, but just that it is not necessarily live. Only the pattern 0000 requires knowledge of whether or not the memory preceding the pattern is live to determine whether or not the memory described by the pattern is live. For example, pattern 0000 may either represent two live words that are part of an object, or two dead words in a gap between two objects.

TABLE 1

| Pattern | Input Parity | Output Parity | # live words | Notes |
|---------|--------------|---------------|--------------|-------|
| 0000 | X | X | 0 or 4 | either two object words or two dead words |
| 0001 | 1 | 0 | 4 | live word of object and object end |

TABLE 1-continued

| Pattern | Input Parity | Output Parity | # live words | Notes |
|---|---|---|---|---|
| 0010 | 0 | 1 | 2 | dead word and object start |
| 0011 | 0 | 0 | 2 | dead word and two-word object |
| 0100 | 1 | 0 | 2 | object end and dead word |
| 0101 | — | — | — | invalid sequence |
| 0110 | 1 | 1 | 4 | object end and object start |
| 0111 | 1 | 0 | 4 | object end and two-word object |
| 1000 | 0 | 1 | 4 | object start and live word of object |
| 1001 | 0 | 0 | 4 | object start and object end |
| 1010 | — | — | — | invalid sequence |
| 1011 | — | — | — | invalid sequence |
| 1100 | 0 | 0 | 2 | two-word object and dead word |
| 1101 | 0 | 1 | 4 | single unit object and object start |
| 1110 | 0 | 1 | 4 | two-word object and object start |
| 1111 | 0 | 0 | 4 | two, two-word objects |

In some embodiments, a heap compactor may be able to rapidly iterate over an object extent bitmap, such as object extent bitmap 400A to calculate the number of live words in a given section of the heap, such as to determine the amount of live data below a particular chunk. Additionally, tables such as Table 1 may be pre-generated for sequences of 4, 8, or 16 bits, with 16, 256, or 65,536 entries respectively (each including 12, 88, or 4180 valid patterns, respectively) may be utilized in various embodiments.

Figure 4B:
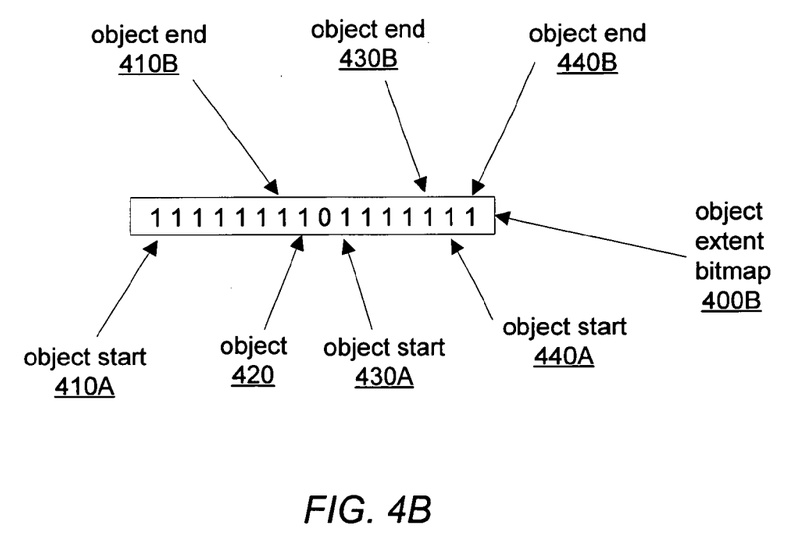

In another embodiment, an object extent bitmap may simply record those memory locations containing parts of reachable objects. For example, FIG. 4B is a block diagram illustrating another method of encoding an object extent bitmap. Object extent bitmap 400B illustrates the same objects represented in object extent bitmap 400A but encoded using a single bit per heap address, according to one embodiment. As should be apparent from a comparison of FIGS. 4A and 4B, object extent bitmap 400B is more compact, taking up half as much memory as object extent bitmap 400A, but may not allow the identification of where objects actually start and end. However, for certain runtime systems, such as those that only allow references to the starts of objects, such an encoding scheme may be effective, according to certain embodiments.

Alternatively, in yet other embodiments, object extent information may be stored using an array or database structure. In general object extent information may be recorded, saved or maintained in any number of different types of data structures, according to various embodiments. The specific method of storing object extent information is not critical to two-pass sliding compaction as described herein. Similarly, the exact manner, method and format used to store and maintain per-chunk metadata 360 may vary from embodiment to embodiment.

Figure 5A:
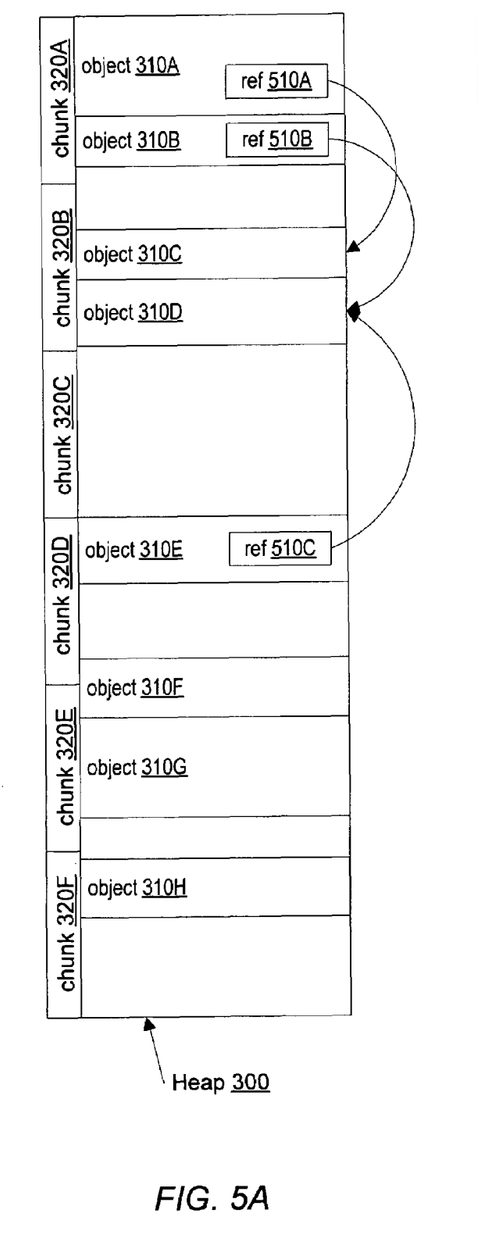
FIGS. 5A and 5B are block diagrams illustrating a heap, including references before and after compaction using two-pass sliding compaction, according to one embodiment.
Figure 5B:
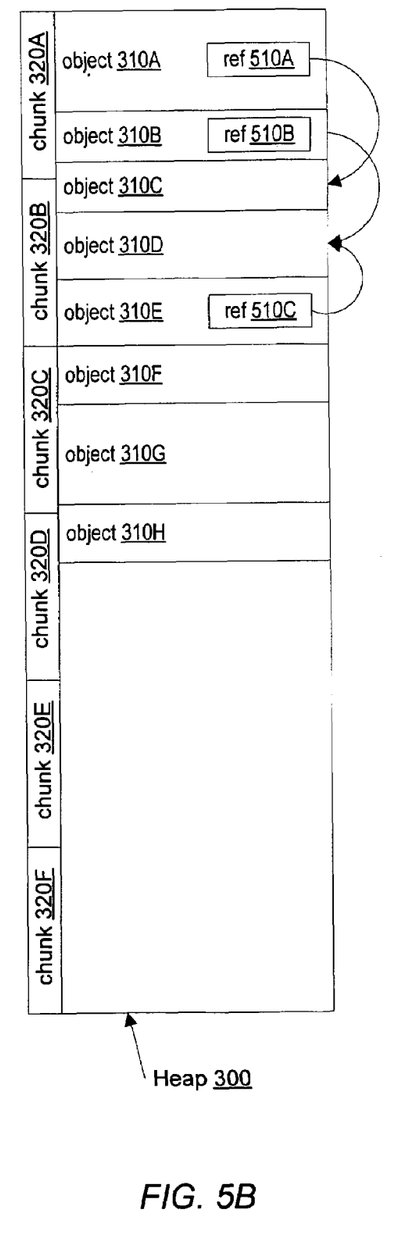

FIGS. 5A and 5B are block diagrams illustrating the compacting of a heap according to two-pass sliding compaction in one embodiment, including the updating of object references. As noted above, two-pass sliding compaction, as described herein, may compact a heap by sliding or moving memory objects in the heap, such as objects 310A-310H, to lower addresses in the heap in order to remove gaps left in the heap by de-allocated or freed memory objects. As is shown in FIG. 5A, objects 310A and 310B are already contiguous, thus making up a dense prefix needing no compaction, according to some embodiments. There is however, a gap between object 310B and object 310C and thus a heap compactor 220, described above regarding FIG. 2, may slide or move object 310C to a lower address to be contiguous with object 310B, as is apparent from FIG. 5B. Since, as illustrated in FIG. 5A, objects 310C and 310D are contiguous before compaction, object 310D may be moved to a location following object 310C's new location in the compacted heap of FIG. 5B. In some embodiments, contiguous objects, such as objects 310C and 310D may be slid or moved together as part of two-pass sliding compaction. In other embodiments, however, each object may be slid or moved individually whether or not objects may be contiguous. Furthermore, in some embodiments only contiguous objects entirely contained within a single chunk of heap 300, such as objects 310C and 310D in chunk 320B, may be slid or moved together as part of two-part sliding compaction.

Similarly, objects 310E, 310F, 310G and 310H may each be moved (or slid) upwards (to lower addresses) resulting in a single contiguous set of objects, as shown in FIG. 5B, according to one embodiment. As described above, when compacting a heap according to two-pass sliding compaction, the destination address (after compaction) for each object may be determined based upon the object extent information and the per-chunk metadata recording during the first, or marking, phase of compaction.

During two-pass sliding compaction, as described herein, references to objects, such as reference 510A to object 310C, may be updated as part of sliding or compacting object 310A that includes reference 510A, in some embodiments. For example, as described above, the destination address of each memory object after compaction may be determined based upon object extent information 350 and per-chunk information 360. According to embodiments, any references in an object may be updated during the compaction of that object. Thus, any reference to a memory object may be updated to point to the object's destination in the compacted heap. A compactor thread, such as compactor thread 225, described above, may update a reference in an object to point to the target object's final destination in the compacted heap before sliding the object containing the reference into its destination in the compacted heap. However, unlike other compaction techniques, object references may be updated as they are encountered during compaction rather than updating all references to all objects before moving or sliding any individual objects. Thus, in the middle of two-pass sliding compaction, references in objects that have been compacted may be updated, but references in objects that have not been compacted may not have been updated (and may not be updated until the object containing them is compacted).

For example, reference 510A in object 310A points to object 310C, as illustrated in FIG. 5A. In some embodiments, heap compactor 220 or compactor thread 225 may update reference 510A to point to object 310C's new location, as illustrated in FIG. 5B. Similarly, reference 510C may point to object 310D and heap compactor 220 may update reference 510C to point to object 310D's destination in compacted heap 300 before sliding object 510E, which contains reference 510C, to its corresponding destination address. Thus, references 510A, 510B and 510C point to objects 310C and 310D, respectively, both before and after two-pass sliding compaction of heap 300, as illustrated by FIGS. 5A and 5B, according to one embodiment.

As noted above, heap compactor 220 and/or compactor thread 225 may determine the destination of any object, such as objects 310A-310H, based upon the information in object extent information 350 and per-chunk information 360 saved during the marking phase of two-pass sliding compaction. For example, compactor thread 225 may lookup, either in per-chunk information 360 or in object extent information 350, the total size for both objects 310A and 310B and determine that object 310C's destination in the compacted heap will be the next heap address after the end of object 310B, as illustrated by FIG. 5B. Thus, compactor thread 225 may total the sizes of all memory objects ahead (i.e. lower in address) than object 310C and determine the destination address of object 310C accordingly. When compacting object 310B, compactor thread 225 may be configured to update reference 510B, which points to object 310C, to point to object 310C's destination address (after compaction) even though object 310C has not been compacted yet, according to some embodiments. As noted above, by ensuring that objects remain in the same order (according to memory address) both before and after two-pass sliding compaction, heap compactor 220 and/or compactor thread 225 may determine the destination address (within the compacted heap) of any memory object in the heap based upon the total size of all objects ahead, i.e. lower in memory address, than the object in question. Thus, the destination address for any object may be determined at anytime during the sliding phase of two-pass sliding compaction and heap compactor 220 may have no need to update all references in the entire heap updating as a separate, distinct phase of compaction.

As noted above, when performing two-pass sliding compaction, as described herein, heap compactor 220 may be configured to logically partition or divide heap 300 into multiple, equal or fixed size, regions, segments, or chunks, as illustrated by chunks 320A-320F in FIGS. 5A and 5B. Splitting heap 300 into multiple, equal sized, chunks may allow multiple compactor threads 225 to compact heap 300 in parallel. Thus, in some embodiments, each compactor thread 225 may compact a single chunk at a time. As described above, during the marking phase of two-pass sliding compaction, information regarding the total about of live data (i.e. total size of all reachable memory objects) in a chunk may be saved in per-chunk information 360. Additionally, in one embodiment, information about the first reachable or unreachable object spanning onto a chunk such as its starting address, class information, and size may also be recorded in per-chunk metadata 360. By recording the total about of live data in each chunk during the marking phase a compactor thread 225 may not have to calculate the total size of all memory objects ahead of a object in question to determine the destination address of the object in question. Instead, in some embodiments, compactor thread 225 may be configured to add up the total live data recorded for each chunk ahead of the chunk currently being compacted and add to that total the total size of any memory objects in the current chunk that are ahead of the object in question to determine the destination address of an object. In other words, by utilizing a running total of the amount of live data in each chunk, as may be saved in per-chunk information 360, compactor thread 225 may quickly determine the destination address for an object. Thus, the destination address of objects in a heap may be determined from either object extent information 350 or per-chunk metadata 360, or both, according to different embodiments. As noted above, a heap compactor may utilize an object extent bitmap, such as object extent bitmap 400A to determine the amount of live data below a particular object and may utilize knowledge regarding specific bit patterns in such an object extent bitmap to rapidly determine a destination address for an object, according to some embodiments.

Figure 6:
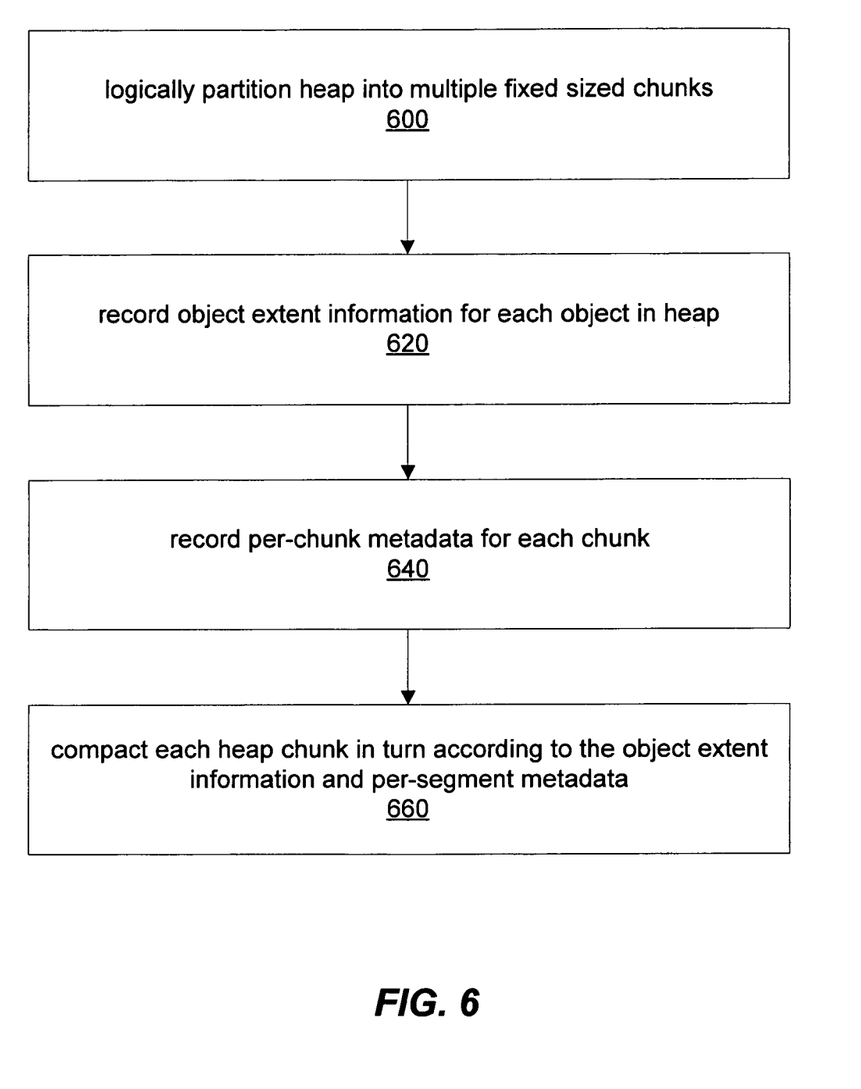
FIG. 6 is a flowchart illustrating one embodiment of a method for two-pass sliding compaction.

FIG. 6 is a flowchart illustrating one embodiment of a method for two-pass sliding compaction as described herein. When implementing two-pass sliding compaction, a heap compactor, such as heap compactor 220, described above, may logically partition the heap to be compacted, such as heap 300, into multiple, fixed size chunks, as illustrated by block 600. The actual size of each segment or chunk of the heap may vary from embodiment to embodiment. Furthermore, in some embodiments, the size of each chunk may be determined by a predetermined number of chunks, such as based upon the number of compactor threads 225 available for parallel compaction. In other embodiments, the number of chunks may be determined based upon a predetermined chunk size. In general the number of chunks and the size of chunks may vary from embodiment to embodiment. In some embodiments, the actual divisions between the logical chunks of heap 300 may not be recorded, stored or maintained, but instead, the boundaries of each chunk may be determined as needed by calculating the starting and ending address for a chunk based upon the fixed size of each chunk and the number of chunks in the heap. In other embodiments, however, a table of chunk boundaries may be maintained, such as part of the data used for synchronizing between multiple compactor threads 225 during two-pass sliding compaction.

Heap compactor 220 may also analyze the objects in the heap to determine object extent information, such as the starting and ending addresses and/or size of each object in the heap and may record the object extent information for each object in the heap, as illustrated by block 620. As described above, heap compactor 220 and/or threads 225 may analyze the heap to determine the object extent information and may store the object extent information using any of various data encoding and formatting schemes. For example, in one embodiment, object extent information may be stored in an object extent bitmap, such as object extent bitmap 400A, described above.

Heap compactor 220 may also analyze each logical chunk in a heap to determine per-chunk metadata, such as the pre-compaction starting address of the first object in the chunk and the total amount of live data (i.e. total size of all live objects) in the chunk. Additionally, in some embodiments, heap compactor 220 may determine a running total of the amount of live data in all chunks below (i.e. lower in address) than each chunk. As described above, heap compactor 220 may record the determined per-chunk metadata for each chunk, as illustrated by block 640. After logically partitioning the heap into multiple chunks, and after determining and saving both object extent information and pre-chunk metadata, as discussed above, heap compactor 220 may perform the actual compacting of the heap by compacting each segment according to the object extent information and per-chunk information, as illustrated by block 660.

In some embodiments, the steps of partitioning the heap and determining object extent information and per-chunk metadata may be considered part of the first, or marking, phase of two-pass sliding compaction. Additionally, in some embodiments, heap compactor 220 may also determine whether the heap includes a dense prefix, that is, a group of contiguous live objects at the head, or start of the heap that do not need any further compaction (but that might include references that may need to be updated).

In some embodiments, the marking phase of two-pass sliding compaction, which may include the three steps discussed above, may be performed in parallel by multiple compactor threads 225. When performing marking in parallel, each compactor thread 225 may claim one of the objects of the heap via any of various well-known thread synchronization techniques, determine the object extent information for the object, and update the pre-chunk metadata for the chunk(s) containing the object, as described above. Each object may be analyzed independently of each other object. In addition, thread synchronization to prevent two different threads from attempting to analyze the same object and to prevent race conditions for a single object may be employed by the various compactor threads 225, according to one embodiment. After marking all reachable objects in the heap, a heap compactor may traverse the per-chunk information to determine the amount of live information in the heap below each chunk, as described above.

As with the functions performed during the marking phase of two-pass sliding compaction, the sliding phase of two-pass sliding compaction may also be performed in parallel by multiple compactor threads 225, according to some embodiments. Each compactor thread 225 may claim the next unclaimed and un-compacted chunk of the heap for compaction, again using standard thread synchronization techniques as necessary to avoid race and deadlock situations between threads. Alternatively, in other embodiments, compactor threads may claim chunks to fill rather than claiming chunks to empty, as described above. In some embodiments, the chunks of the heap may be compacted in turn from the lowest addressed chunk upwards to ensure that no chunk is overwritten before its objects have been moved (slid) to their respective addresses. According to other embodiments, a per-chunk counter may be maintained indicating the number of destination chunks to which memory in a chunk may be relocated by compaction. For each source chunk, this number may be determined by calculating the destination chunks for the first and last units of memory being relocated from a given chunk and recording the number of chunks separating these destination addresses. This number may be further incremented by one if the destination chunk for the first memory unit is not the same as the current source chunk. This per-chunk counter may be decremented as memory destined for each of the possible destinations is relocated. Once the counter indicates all memory in a chunk has been relocated, a compacting thread may claim the chunk so that it may be filled. In these embodiments, chunks need not be emptied or filled in address order.

Figure 7:
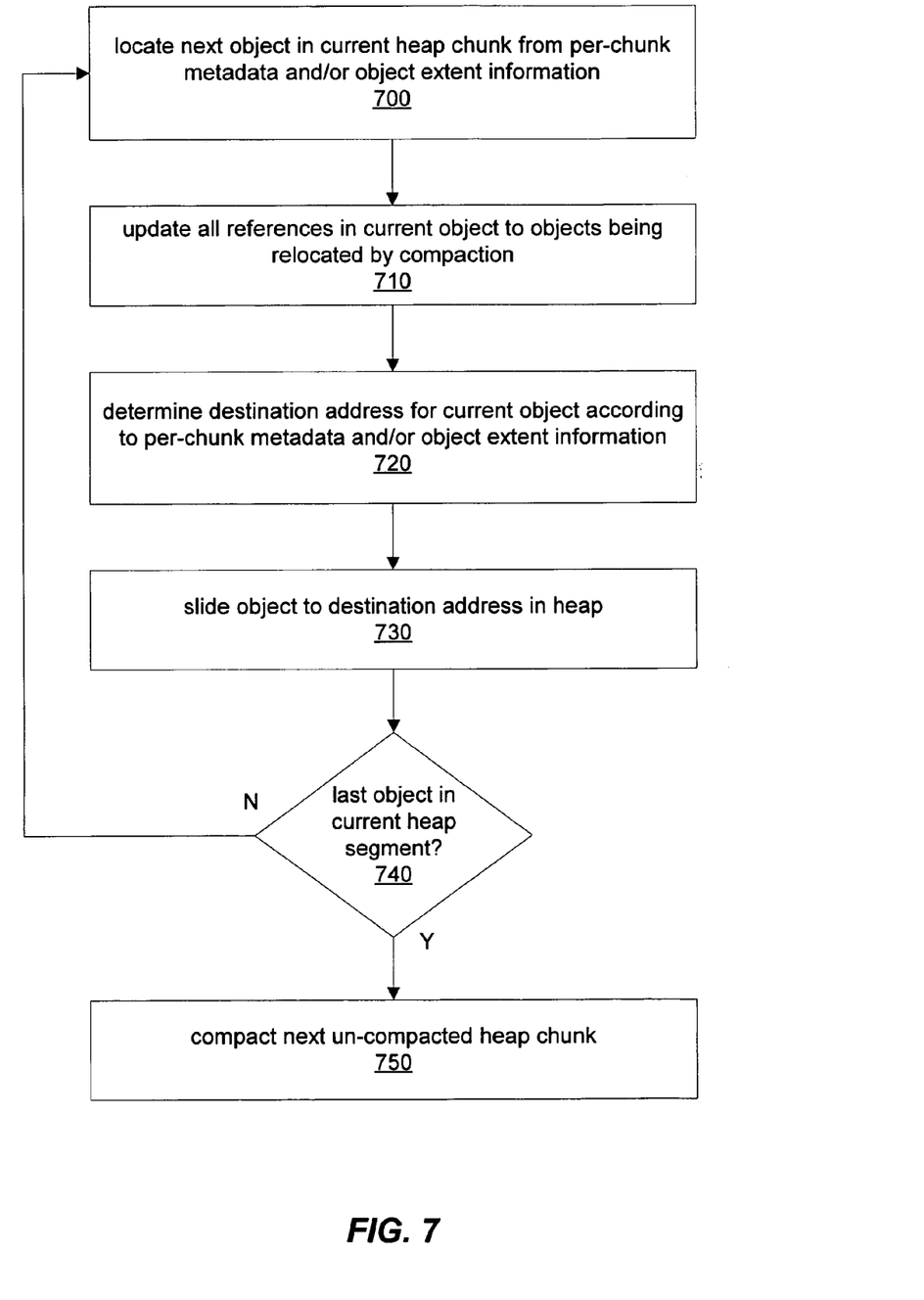
FIG. 7 is a flowchart illustrating one embodiment of a method for compacting one segment of a heap using two-pass sliding compaction.

FIG. 7 is a flowchart illustrating one embodiment of a method for compacting a single chunk of a heap. A compactor thread 225 may perform such a method after claiming a chunk of a heap, in some embodiments. A heap compactor or compactor thread may first locate the next live object in the current chunk from the per-chunk metadata and/or from the object extent bitmap, as illustrated by block 700.

Compactor thread 225 may also update all references in the current object to objects being relocated by compaction, as illustrated by block 710. For example, as discussed above, a compactor thread 225 may determine the destination address (after compaction) for an object pointed to by a reference and update that reference to point to the destination address. Thus, each compactor thread 225 may update the references in objects of the current chunk being compacted even if those references point to objects that have not been compacted yet, by determining the destination address of a referenced object even though it may not have been compacted. In fact, a compactor thread 225 may not even determine or take into account whether or not the referenced object has been compacted when updating a reference to the object, according to some embodiments.

Additionally, compactor thread 225 may determine the destination address for the current object according to per-chunk metadata and/or object extent information, as illustrated by block 720. For example, in one embodiment, compactor thread 225 may calculate the object's destination address by added up the total size of all live objects with lower addresses than the current object.

After determining the destination address for the current object, compactor thread 225 may copy, move or slide the object to its destination address within the heap, as illustrated by block 730. Even through the terms "move" and "slide" are used herein regarding compacting objects in a heap, one skilled in the art will recognize that the data in the memory range of an object is actually copied to the destination address. The terms "slide" and "sliding" are used because the objects in the heap are kept in the same order (in term of address) before and after compaction. Thus, it is as if the objects were slid together to close the gaps between them. If the object just slid was the last object in the current heap chunk, as illustrated by block 740, compactor thread 225 may move on to claim and compact the next un-compacted and unclaimed heap chunk, as illustrated by block 750, in some embodiments. Otherwise, compactor thread 225 may move on and locate the next object in the chunk, as illustrated by block 700 and described above. After compacting a chunk of the heap, compactor thread 225 may update various data structures, such as per-chunk metadata, to identify the chunk as having been compacted, or emptied (since its object have been copied to their destinations), according to one embodiment. Thus, other threads may be able to access the same data structures to determine whether or not that chunk is available to copy (or slide) other objects whose destination addresses may reside within that chunk, in some embodiments.

Figure 8:
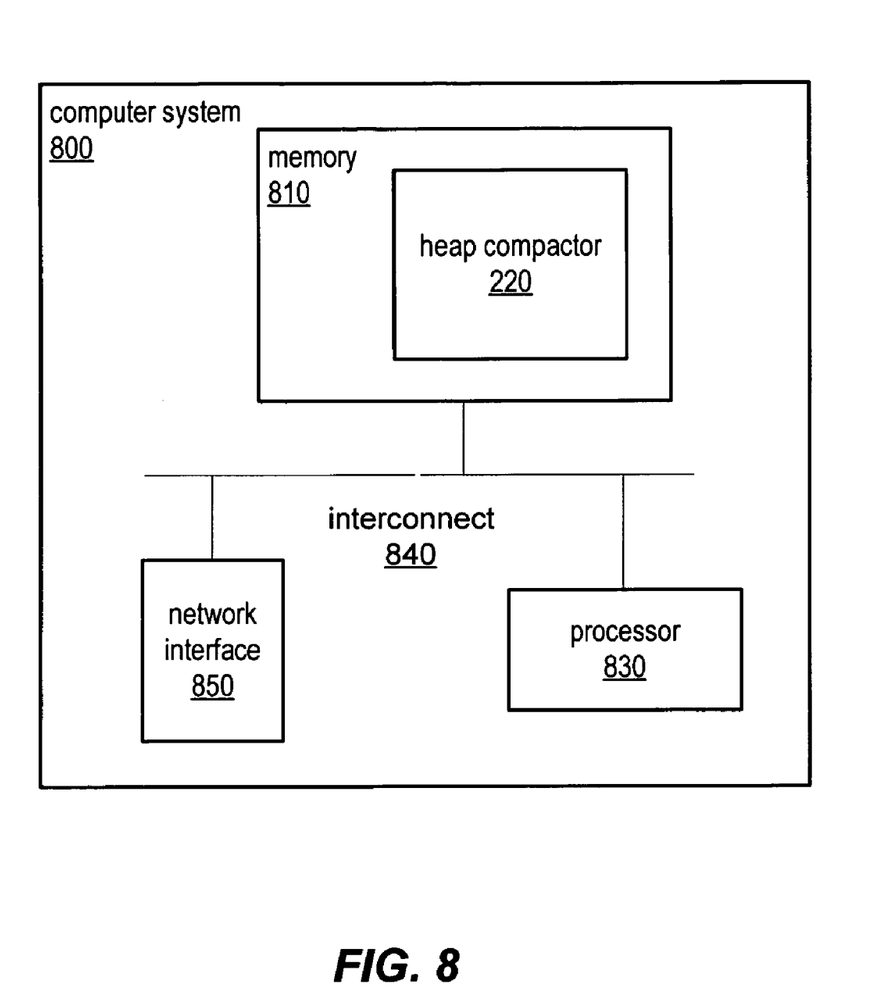
FIG. 8 is a block diagram illustrating an exemplary computer system capable of implementing two-pass sliding compaction, according to one embodiment.

FIG. 8 illustrates a computing system capable of implementing two-pass sliding compaction, as described herein and according to various embodiments. Computer system 800 and system 200, described above, may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device configured to manage memory in a heap.

Computer system 800 may include at least one processor 830. Processor 830 may couple across interconnect 840 to memory 810. Memory 810 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 810 may include program instructions configured to implement two-pass sliding compaction as described herein. In certain embodiments memory 810 may include program instructions configured to implement a heap compactor, such as heap compactor 220. In such embodiments, system heap compactor 220 may include program instructions configured to implement two-pass sliding compaction as described herein. A heap compactor may be implemented in any of various programming languages or methods. For example, in one embodiment, heap compactor 220 may be JAVA based, while in another embodiments, heap compactor 220 may be written using the C or C++ programming languages.

Although the embodiments above have been described in detail, numerous variations and modifications will become apparent once the above disclosure is fully appreciated. It is intended that the following claims be interpreted to embrace all such variations and modifications.

What is claimed is:

1. A method for compacting a computer memory heap, comprising:
    logically partitioning the heap into a plurality of chunks, wherein the heap comprises a plurality of allocated memory objects; and
    compacting one or more chunks of the plurality of chunks independently of others of the plurality of chunks, wherein for each of the one or more chunks said compacting comprises:
        updating one or more references from one or more memory objects in the chunk to one or more respective referenced memory objects in the heap, wherein said updating comprises determining for each reference a post-compaction destination address within the heap for the respective referenced memory object; and
        moving each of one or more memory objects in the chunk to respective post-compaction destination addresses in the heap, wherein after said moving the one or more memory objects comprise one contiguous block of objects.

2. The method of claim 1, further comprising determining per-chunk metadata for each of the plurality of chunks prior to said compacting, wherein the per-chunk metadata comprises:
    a total amount of live memory in the chunk; and
    a pre-compaction starting address for a first memory object in the chunk, wherein the first memory object in the chunk has a lower pre-compaction starting address than any other memory object in the chunk.

3. The method of claim 2, wherein the per-chunk metadata further comprises:
    an indication of a class of the first object in the chunk; and
    an indication of a size of the first object in the chunk.

4. The method of claim 2, wherein the pre-compaction starting address for the first memory object in the chunk is relative to a starting address for the chunk.

5. The method of claim 2, wherein each of a plurality of compactor threads perform said determining for respective ones of the plurality of chunks in parallel.

6. The method of claim 1, wherein each of a plurality of compactor threads perform said compacting on respective ones of the plurality of chunks in parallel.

7. The method of claim 1, further comprising:
    determining a dense prefix for the heap, wherein the dense prefix comprises one or more contiguous memory objects located at a start of the heap; and
    not moving one or more of the plurality of chunks including the one or more memory objects of the dense prefix.

8. The method of claim 1, further comprising determining, prior to said compacting, object extent information for each of the plurality of memory objects, wherein the object extent information comprises a pre-compaction starting address and a size for the respective memory object.

9. The method of claim 8, further comprising storing the object extent information for each of the plurality of memory objects in an object extent bitmap configured to encode the pre-compaction starting address and the size for each of the plurality of objects.

10. The method of claim 9, wherein the object extent bitmap is further configured to encode a pre-compaction ending address for each of the plurality of objects.

11. The method of claim 9, wherein said determining a post-compaction destination address for a respective referenced memory object comprises determining a total size for one or more memory objects with lower starting addresses than the referenced memory object according to the object extent information.

12. The method of claim 11, wherein said determining a total size comprises analyzing at least a portion of the object extent bitmap according to one or more sequences of bit patterns, each indicating a number of memory addresses of the object extent bitmap that are associated with one or more memory objects, and wherein each sequence comprises more bits than a default bit encoding size for the object extent bitmap.

13. The method of claim 1, further comprising storing in a bitmap, prior to said compacting, information indicating one or more memory addresses of the heap corresponding to the respective memory object, wherein the bitmap is configured to store information memory addresses of the heap corresponding to the plurality of allocated memory objects.

14. A device, comprising:
    a memory heap comprising a plurality of allocated memory objects;
    a processor; and
    a memory coupled to the processor, wherein the memory comprises program instructions configured to implement a heap compactor configured to:
        logically partition the memory heap into a plurality of chunks; and
        compact each of the plurality of chunks independently of others of the plurality of chunks, wherein for each chunk said heap compactor is configured to:
            update one or more references from one or more memory objects in the chunk to one or more respective referenced memory objects in the heap, wherein said updating comprises determining for each reference a post-compaction destination address within the heap for the respective referenced memory object; and
            move each of one or more memory objects in the chunk to respective post-compaction destination addresses in the heap, wherein after said moving the one or more memory objects comprise one contiguous block of objects.

15. The device of claim 14, wherein the heap compactor is further configured to determine per-chunk metadata prior to said compacting, for each of the plurality of chunks prior to said compacting, the per-chunk metadata comprising:
    a total amount of live memory in the chunk; and
    a pre-compaction starting address for a first memory object in the chunk, wherein the first memory object in the chunk has a lower pre-compaction starting address than any other memory object in the chunk.

16. The device of claim 15, wherein the pre-compaction starting address for the first memory object in the chunk is relative to a starting address for the chunk.

17. The device of claim 15, wherein the heap compactor comprises a plurality of compactor threads each configured to determine the per-chunk metadata for respective ones of the plurality of chunks in parallel.

18. The device of claim 14, wherein the heap compactor comprises a plurality of compactor threads each configured to compact respective ones of the plurality of chunks in parallel.

19. The device of claim 14, wherein the heap compactor is further configured to:
    determine a dense prefix for the heap, wherein the dense prefix comprises one or more contiguous memory objects located at a start of the heap; and
    not move one or more of the plurality of chunks including the one or more memory objects of the dense prefix.

20. The device of claim 14, wherein the heap compactor is further configured to determine, prior to said compacting, object extent information for each of the plurality of memory objects, wherein the object extent information comprises a pre-compaction starting address and a size for the respective memory object.

21. The device of claim 20, wherein the heap compactor is further configured to store the object extent information for each of the plurality of memory objects in an object extent bitmap configured to encode the pre-compaction starting address and the size for each of the plurality of objects.

22. The device of claim 21, wherein as part of said determining a post-compaction destination address for a respective referenced memory object the heap compactor is further configured to determine a total size for one or more memory objects with lower starting addresses than the referenced memory object according to the object extent information.

23. A computer accessible medium, comprising program instructions configured to implement:

logically partitioning the heap into a plurality of chunks, wherein the heap comprises a plurality of allocated memory objects; and compacting one or more chunks of the plurality of chunks independently of others of the plurality of chunks, wherein for each of the one or more chunk said compacting comprises:

updating one or more references from one or more memory objects in the chunk to one or more respective referenced memory objects in the heap, wherein said updating comprises determining for each reference a post-compaction destination address within the heap for the respective referenced memory object; and moving each of one or more memory objects in the chunk to respective post-compaction destination addresses in the heap, wherein after said moving the one or more memory objects comprise one contiguous block of objects.

* * * * *